United States Patent [19]

Hardeng

[11] Patent Number: 4,845,573
[45] Date of Patent: Jul. 4, 1989

[54] SYSTEM WITH FILTER SYSTEM FOR IMPROVED RELIABILITY FOR RECORDING DATA ON A MAGNETIC RECORDING MEDIUM

[75] Inventor: Erik N. Hardeng, Olso, Norway

[73] Assignee: Tandberg Data A/S, Oslo, Norway

[21] Appl. No.: 85,390

[22] Filed: Aug. 14, 1987

[30] Foreign Application Priority Data

Oct. 6, 1986 [DE] Fed. Rep. of Germany ....... 3634029

[51] Int. Cl.⁴ ............................................... G11B 5/09
[52] U.S. Cl. .......................................... 360/46; 360/66
[58] Field of Search .............................. 360/46, 66, 68

[56] References Cited

U.S. PATENT DOCUMENTS

| 3,381,098 | 4/1968 | Pezirtzoglou . | |
| 3,641,524 | 2/1972 | Norris . | |
| 3,665,485 | 5/1972 | Pear, Jr. . | |
| 3,821,797 | 6/1974 | Suzuki et al. | 360/66 |
| 4,202,017 | 5/1980 | Geffon et al. | 360/45 |
| 4,383,281 | 5/1983 | Lesieur | 360/45 |
| 4,547,818 | 10/1985 | Lia | 360/46 |

FOREIGN PATENT DOCUMENTS

| 56-80118 | 1/1982 | Japan | 360/68 |
| 56-108448 | 1/1983 | Japan | 360/68 |

OTHER PUBLICATIONS

IBM Technical Disclosure Bulletin, vol. 15, No. 3, Aug. 1972, J. D. Armitage, Jr. et al, "Magnetic Recording and Feedback Systems".
IBM Technical Disclosure Bulletin, vol. 23, No. 9, Feb. 1981, K. B. Klaassen, "AC Bias Read-While-Write Driver".
Japan—Patent No. 57-3207(A), vol. 6, No. 62 (P-111) (940), Apr. 21, 1982.

Primary Examiner—Vincent P. Canney
Assistant Examiner—Kevin J. Fournier

[57] ABSTRACT

In an arrangement for recording data or a magnetic recording medium, the inputs of an amplifier whose outputs are connected to a magnetic head are preceded by filters which delay magnetic bias signals and data signals supplied to the amplifier and limit their steepness. Undesirably high voltages at the magnetic head as a consequence of excessively steep edges of a write current supplied to the magnetic head are thus avoided, and the reliability of the recording of the data on the magnetic recording medium is increased.

13 Claims, 2 Drawing Sheets

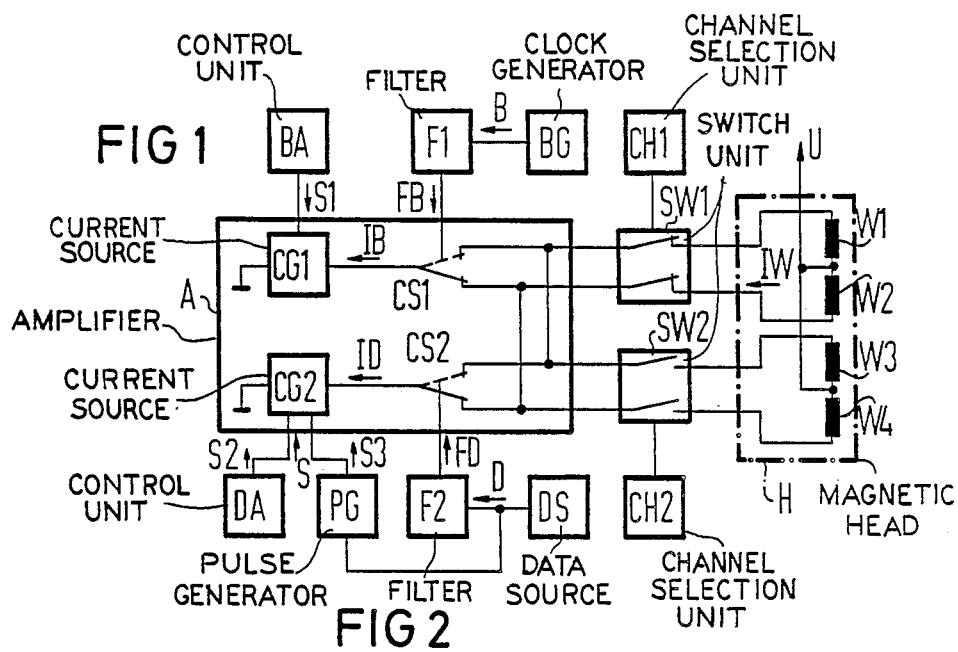
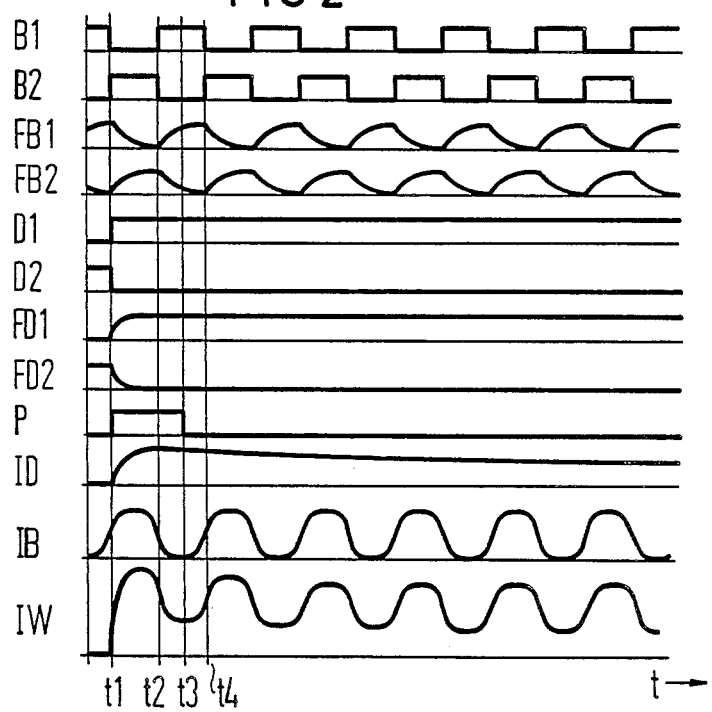

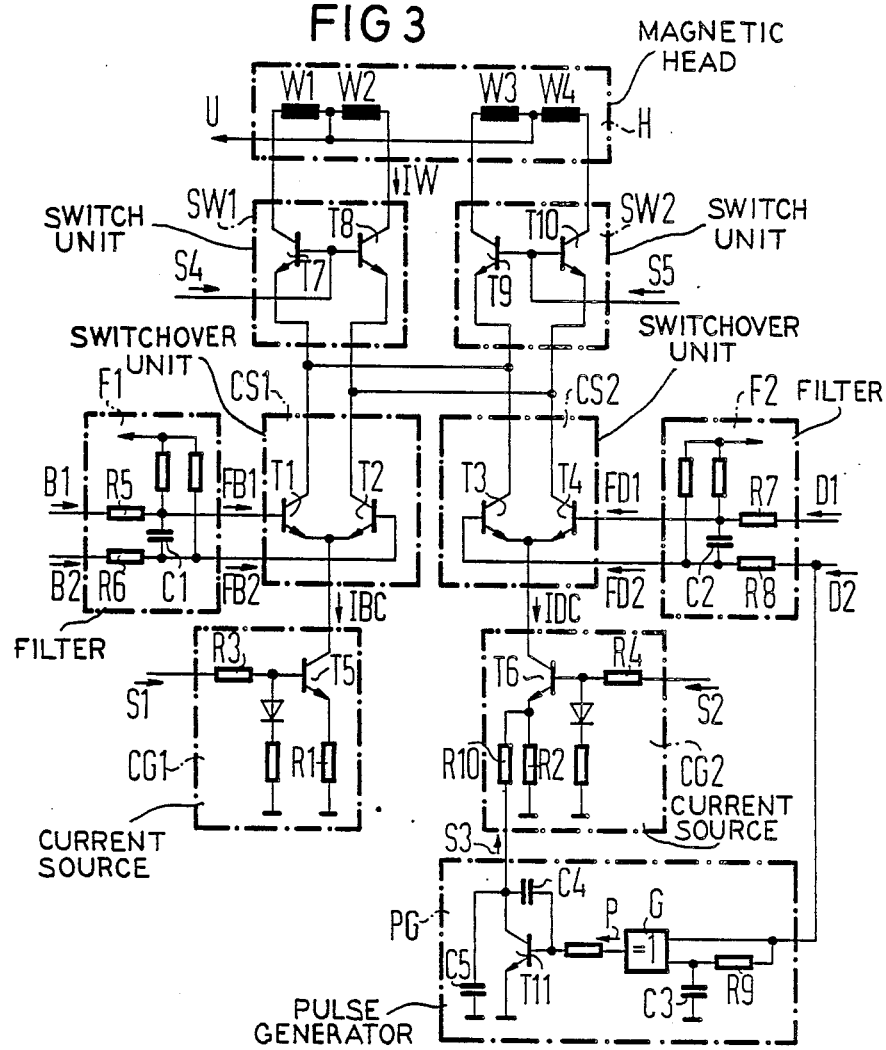

SYSTEM WITH FILTER SYSTEM FOR IMPROVED RELIABILITY FOR RECORDING DATA ON A MAGNETIC RECORDING MEDIUM

BACKGROUND OF THE INVENTION

1. Field of the Invention

The invention is directed to an arrangement for recording data on a magnetic recording medium by use of an amplifier at whose inputs data signals allocated to the data to be recorded, and magnetic bias signals, are present. Outputs of the amplifier are connected to a magnetic head to record the data on the recording medium.

2. Description of the Prior Art

An arrangement comprising an amplifier is usually employed for recording data on a magnetic recording medium, for example a magnetic tape or a magnetic disc. Data signals are allocated to the data to be recorded and magnetic bias signals are supplied to the input of this amplifier. Its outputs are connected to a write head in a magnetic head which records the data on the recording medium. Such an arrangement is disclosed, for example, by German published application No. 32 33 489. In this known arrangement, the data signals and the magnetic bias signals are supplied to an amplifier stage of the amplifier. The outputs of the amplifier stages are connected in parallel and are connected to the terminals of the two series-connected windings of the magnetic head at whose center tap an operating voltage is present. The amplifier stages are fashioned as switching elements so that the current flowing through a respective winding of the magnetic head exhibits extremely steep signal edges.

A further arrangement for recording data on a magnetic recording medium is disclosed by U.S. Pat. No. 4,383,281, incorporated herein by reference. In this known arrangement, two amplifier stages connected in parallel at their output sides are also provided, these being supplied with the magnetic bias signals or the data signals. Every amplifier stage is designed as a differential amplifier, whose common branch is designed as a current source, and whose inputs are supplied with the respective signals either not inverted or inverted. In this known arrangement, the current flowing through the magnetic head exhibits very steep edges since the two differential amplifiers are driven by the magnetic bias signals or the data signals whose signal edges are steep.

Since the edges of the write current flowing through the magnetic head are extremely steep, the time-wise change of the write current in the magnetic head is extremely large and the voltage at the magnetic head would move towards infinity if the magnetic head were loss-free and did not exhibit any stray capacitances. This can result in the fact that, due to a voltage limitation, flux changes allocated to the data signals and to the magnetic bias signals are modified, this potentially deteriorating the reliability against malfunction and the reliability against errors in the recording of the data.

SUMMARY OF THE INVENTION

It is an object of the invention to specify an arrangement for recording data on a magnetic recording medium by means of which reliability against malfunction and reliability against errors can be increased.

According to the invention, inputs of the amplifier allocated to the magnetic bias signals and/or to the data signals are preceded by filters designed as low-pass filters which delay the magnetic bias signals or the data signals respectively, and thus limit their steepness to a desired value.

The arrangement of the invention has the advantage that the data can be recorded with great precision on the magnetic recording medium, and thus can be played back with high reliability by means of a read head. The employment of the filter preceding the amplifier requires little expense since the filters can be constructed with passive components.

It is possible to supply only the magnetic bias signals or the data signals to the amplifier via a respective filter; however, it proves expedient to supply both the magnetic bias signals as well as the data signals to the amplifier via respective filters.

In case the amplifier has a respectively separate amplifier stage both for the magnetic bias signals as well as for the data signals to which the magnetic bias signals or the data signals are supplied in non-inverted and inverted fashion, it is expedient to precede the inputs of every amplifier stage by a filter at which the respective signals are present in non-inverted and inverted fashion and whose outputs are connected to the inputs of the respective amplifier stage. The filter is preferably fashioned as a RC low-pass filter. Given a design of the filter for the feed of inverting and non-inverting signals, it is advantageous when every filter contains two series connected resistors at which the non-inverted or inverted signals are present, and which contains a following, parallel capacitor whose terminals are connected to the inputs of the respective amplifier stage.

In case the amplifier stages are designed as differential amplifiers, the corresponding signals are present at the inputs of every differential amplifier in non-inverted and inverted fashion via a respective filter.

Given employment of differential amplifiers as amplifier stages, it is beneficial when the write current supplied to the magnetic head is adjustable in the common branch of every differential amplifier, and is adjustable on the basis of digital data words which are converted into control signals for the respective differential amplifier by means of a respective digital-to-analog converter.

In case a plurality of write heads are provided in the magnetic head, it is advantageous when a switch unit is arranged between the amplifier and the magnetic head, this switch unit connecting the amplifier to one of the write heads upon employment of a channel selection stage.

A further improvement of the recording can be achieved in that the corresponding write current is briefly boosted before and/or after every signal edge of the data signals. For this purpose, a pulse generator is provided which emits a corresponding control signal to the amplifier at every signal edge of the data signals.

In order to also avoid steep signal edges of the write current here, it is advantageous when the pulse generator contains an integrating element.

BRIEF DESCRIPTION OF THE DRAWINGS

FIG. 1 is a block circuit diagram of the arrangement of the invention;

FIG. 2 is a time diagram of signals at various points of the arrangement shown in FIG. 1; and FIG. 3 is a circuit diagram of the arrangement of the invention.

DESCRIPTION OF THE PREFERRED EMBODIMENTS

The arrangement shown in FIG. 1 contains an amplifier A whose outputs are connected to a respective write head in a magnetic head H via switch units SW1 and SW2. It is assumed in the illustration of FIG. 1 that the write head formed of two windings W1 and W2 is selected, and switches within the switch unit SW1 are closed by a channel selection circuit CH1. The switches in the switch unit SW2 are opened by a channel selection circuit CH2.

The amplifier A contains switch-over units CS1 and CS2 which supply a write current IW respectively generated in current sources CG1 or CG2 either to a terminal of the winding W1 or to a terminal of the winding W2. An operating voltage U is present at the respective other terminal at a common tap.

A clock generator BG generates high-frequency magnetic bias signals B which are supplied to the switch-over unit CS1 via a filter F1 as filtered magnetic bias signals FB. Dependent on the momentary value of the magnetic bias signals FB, a write current IB allocated to the magnetic bias signals B is supplied to the various terminals of the write head. The size of the write current IB is determined in the current source CG1 by a control signal S1 which is output by a control unit BA. The control unit BA, for example, can contain a digital-to-analog converter which generates the control signal S1 from a corresponding digital data word.

A data source DS generates data signals D which are allocated to the digital data to be recorded. These data signals D proceed via a filter F2 to the switch-over unit CS2 as filtered data signals FD, and the unit CS2 conducts a write current ID allocated to the data signals D to the various terminals of the write head likewise dependent on the momentary value of the data signals FD. The write current ID is set in the current source CG2 by control signals S2 which are generated in a control unit DA in a way similar to the control signals S1. In addition, a pulse generator PG can be provided, this being driven by the data signals and outputting control signals S3 to the current source CG2. These control signals S3 briefly boost the write current ID at every signal edge of the data signals D.

Since the outputs of the switch-over units CS1 and CS2 are connected in parallel, a summation of the write current IB and ID occurs in the write head and a write current IW results. This write current flows from the voltage source for the operating voltage U via one of the windings W1 or W2, via the switch unit SW1, via the switch-over unit CS1, and via the switch-over unit CS2 to the current sources CG1 and CG2.

Further details of the arrangement shown in FIG. 1 shall be set forth below in conjunction with the time diagrams shown in FIG. 2.

The magnetic bias signals B output by the clock generator BG are shown as non-inverted and inverted magnetic bias signals B1 or B2 in FIG. 2. The filter F1, which is designed as a low-pass filter, obliterates and delays the edges of the magnetic bias signals B1 and B2, and limits their steepness. Thus, the filtered magnetic bias signals FB1 or FB2 are generated. The data signals D are likewise output by the data source DS as non-inverted and inverted data signals D1 or D2, and are obliterated in the filter F2 in a way similar to the magnetic bias signals B1 and B2. Thus, the filtered data signals FD1 and FD2 are output to the switch-over unit CS2.

The switch-over units CS1 and CS2 are designed as analog switches, so that the write currents IB and ID do not exhibit a rectangular curve, but likewise exhibit signal edges having a limited slope. In the pulse generator PG, a pulse P is generated at every signal edge of the data signals D, this pulse P being likewise supplied to the current source CG2 after filtering in order to briefly boost the write current ID after every signal edge of the data signals D. The write current ID shown in FIG. 2 thus results when, at point in time t1, the data signal D has an edge which should optimally coincide with an edge of a magnetic bias signal B. At point in time t3, the pulse P is ended and the write current ID in one of the windings W1 or W2, for example in the winding W2, comprises the curve shown in FIG. 2. If no write current ID were present, the write current IB in the winding W2 would likewise have the curve shown in FIG. 2. However, the write current ID and the write current IB are summed, so that the overall write current IW shown in the winding W2 results when the data signal D1 exhibits the illustrated binary value. During the illustrated chronological duration, no write current ID flows through the windings W2 since the switch-over unit CS2 is in the position shown with solid lines. However, a corresponding write current IB does, such that the sum of the write currents IB flowing through the two windings W1 and W2 is constant. The analogous case applies when the data signal D1 changes its binary value since the write current ID no longer flows through the winding W1, but through the winding W2.

In the circuit diagram of the arrangement shown in FIG. 3, the switch-over units CS1 and CS2 are component parts of a differential amplifier comprising the transistors T1 and T2 or T3 and T4. The current sources CG1 and CG2 of the differential amplifier each contain a transistor T5 or T6, and a resistor R1 or R2 arranged in series therewith. The control signals S1 or S2 for setting the write current IB or ID are each supplied via resistor R4 or R3.

The magnetic bias signals B1 and B2 are supplied to the bases of the transistors T1 or T2 via the filter F1 as filtered magnetic bias signals FB1 or FB2. The filter F1 contains two serial resistors R5 and R6 and a capacitor C1. In a corresponding way, the data signals D1 and D2 are supplied to the bases of the transistors T4 or T3 via the filter F2 as filtered data signals FD1 or FD2. The filter F2 is fashioned in a way similar to the filter F1 and contains resistors R7 and R8 as well as a capacitor C2.

The switch units SW1 and SW2 are each formed of two transistors T7 and T8 or T9 and T10 whose bases are selected by control signals S4 or S5 output by a channel selection unit CH1 or CH2. The switch units are selected in order to supply the write currents IB and ID either to the write head formed of the windings W1 and W2 or to a write head in the magnetic head H formed of the windings W3 and W4.

The data signals D2 are also supplied to the pulse generator PG which generates the pulses P by use of a delay element formed of a resistor R9 and a capacitor C3, and by use of an EXCLUSIVE-OR element G, whereby the pulse duration of the pulse P is defined by the time constant of the RC element. The pulse P proceeds via an integrating element formed of a transistor T11 and of capacitors C4 and C5 to the current source CG2 as signal S3. There, it is supplied to a resistor R10 which is arranged parallel to the resistor R2. During the presence of the signal S3, the transistor T11 is activated and the resistor R10 is switched parallel to the resistor R2, so that the write current ID is briefly boosted.

When, at point in time t1, the magnetic bias signals B1 and B2 and the data signals D1 and D2 assume binary values shown in FIG. 2, the transistors T1 and T3 are inhibited and the transistors T2 and T4 are activated. Given the assumption that the signal S4 activates the transistors T7 and T8 as a consequence of a channel selection, and the signal S5 inhibits the transistors T9 and T10, a write current IW now flows from the voltage source for the operating voltage U via the winding W2 and the transistor T8. Write current IW flows as write current IB via the transistors T2 and T5 and via the resistor R1. Write current IW flows as write current ID via the transistors T4 and T6 and the resistor R2 as well as via the resistor R10 and the transistor T11.

When, at point in time t2, the magnetic bias signals B1 and B2 change in binary value, the transistor T1 is activated and the transistor T2 is inhibited. The write current ID thus continues to flow via the winding W2 and the transistors T8 and T4. However, the write current IB flows via the winding W1 and the transistors T7, T1, and T5. The write current IB in the transistor T5 does not change since the transistors T1 and T2 alternately carry the write current IB, and as a consequence of the filter F1, the write current IB is delayed and the edge steepness when switching the transistors T1 and T2 is reduced. Thus, no excessive voltages occur at the windings W1 and W2.

The pulse P is ended at point in time t3 and the transistor T11 is inhibited, so that the write current ID is slowly reduced to a nominal value.

At point in time t4, the binary values of the magnetic bias signals B1 and B2 change again, so that, as in the case at point in time t1, the transistor T1 is inhibited and the transistor T2 is activated.

When, at a later point in time, the data signal D1 changes in binary value, the transistor T4 is inhibited and the transistor T3 is activated and a new pulse P is simultaneously generated. The write current ID then flows via the winding W1, the transistor T7, and the transistor T3 to the transistor T6. Here too, the filter F2 carries out a soft switching so that no excessive voltages occur at the windings W1 and W2 and the write current ID remains constant. When a recording is to occur with the write head formed of the windings W3 and W4, the transistors T9 and T10 are activated by the signal S5, whereas the transistors T7 and T8 are inhibited by the control signal S4. The events in the windings W1 and W2 then repeat correspondingly in the windings W3 and W4.

LC low-pass filters can also be employed as filters F1 and F2. However, the RC low-pass filters prove very cost-beneficial. It is also possible to employ only a single filter either for the magnetic bias signals B or for the data signals D.

Although various minor changes and modifications might be proposed by those skilled in the art, it will be understood that I wish to include within the claims of the patent warranted hereon all such changes and modifications as reasonably come within my contribution to the art.

I claim as my invention:

1. A system for recording data on a magnetic recording medium, comprising:
a magnetic head;
amplifier means connected to the magnetic head for recording data via the magnetic head on the recording medium, said amplifier means having a first input connected to receive magnetic bias signals and a second input connected to receive data signals; and
a magnetic bias signal source connected to the first input via a first filter means and a data source connecting to the second input via a second filter means, said first and second filter means functioning as low-pass filters so as to delay the respective magnetic bias signals or the data signals received at the respective first and second inputs and limit their sharpness to a desired value.

2. A system according to claim 1 wherein said amplifier means has first and second amplifier stages whose respective outputs are connected in parallel and wherein means are provided for connecting inputs of the first amplifier stage to either inverted or non-inverted filtered magnetic bias signals from said first filter means, and means being provided for connecting inputs of the second amplifier stage to either inverted or non-inverted filter data signals from said second filter means.

3. A system according to claim 1 wherein said first and second filter means comprise RC low-pass filters.

4. A system according to claim 2 wherein each of the first and second filter means has a series resistor at each of its first and second inputs and a capacitor in parallel to the two series resistors.

5. A system according to claim 2 wherein the first and second amplifier stages comprise differential amplifiers whose first and second inputs are connected to first and second outputs of the respective first or second filter means, said first and second filter means having first and second inputs, the first filter means first and second inputs connecting to inverted and non-inverted bias signals from said bias signal source and the first and second inputs of the second filter means connecting to inverted and non-inverted data signals from said data source.

6. A system according to claim 1 wherein means are provided for setting a write current in said amplifier means by digital data words which are converted into control signals for controlling the amplifier means through a digital-to-analog converter.

7. A system according to claim 1 wherein the magnetic head comprises a plurality of write heads and wherein first and second switch means connect respective write heads to respective outputs of said amplifier means.

8. A system according to claim 1 wherein a pulse generator means is connected to an input of said second filter means and also to said amplifier means for boosting a write current at every signal edge of the data signals.

9. A system according to claim 8 wherein said pulse generator means contains an integrating circuit.

10. A system for recording data on a magnetic recording medium, comprising:
a magnetic head;
amplifier means connected to the magnetic head for recording data via the magnetic head on the recording medium, said amplifier means having a first input means for receiving magnetic bias signals and a second input means for receiving data signals;
a magnetic bias signal source connected to the first input means via a first filter means and a data source connecting to the second input means via a second filter means, said first and second filter means functioning as low-pass filters so as to delay the magnetic bias signals or the data signals, respectively, and limit their sharpness to a desired value; and first and second switch-over means in said amplifier means respectively controlled by the magnetic bias signals and data signals at the respective first and second inputs.

11. A system according to claim 10 wherein first and second switch units are connected between the amplifier means and first and second write heads in the magnetic head, said first and second switch units being connected to respective channel selection units.

12. A system for recording data on a magnetic recording medium, comprising:

a magnetic head;

amplifier means connected to the magnetic head for recording data via the magnetic head on the recording medium, said amplifier means having a first input for receiving magnetic bias signals and a second input for receiving data signals;

a magnetic bias signal source connected to the first input via a first filter means and a data source connecting to the second input via a second filter means, said first and second filter means functioning as low-pass filters so as to delay the magnetic bias signals or the data signals, respectively, and limit their sharpness to a desired value; and a pulse generator means connected to an input of said second filter means and also to said amplifier means for boosting a write current at every signal edge of the data signals.

13. A system for recording data on a magnetic recording medium, comprising:

a magnetic head;

amplifier means connected to the magnetic head for recording data via the magnetic head on the recording medium, said amplifier means having a first input for receiving magnetic bias signals and a second input for receiving data signals;

a magnetic bias signal source connected to the first input via a first filter means and a data source connecting to the second input via a second filter means, said first and second filter means functioning as low-pass filters so as to delay the magnetic bias signals or the data signals, respectively, and limit their sharpness to a desired value;

said amplifier means having first and second amplifier stages whose respective outputs are connected in parallel and wherein means are provided for connecting inputs of the first amplifier stage to either inverted or non-inverted filtered magnetic bias signals from said first filter means, and means being provided for connecting inputs of the second amplifier stage to either inverted or non-inverted filter data signals from said second filter means; and the first and second amplifier stages comprising differential amplifiers whose first and second inputs are connected to first and second outputs of the respective first or second filter means, said first and second filter means having first and second inputs, the first filter means first and second inputs connecting to inverted and non-inverted bias signals from said bias signal source, and the first and second inputs of the second filter means connecting to inverted and non-inverted data signals from said data source.

* * * * *